June 28, 1960   S. A. DEBNER ET AL   2,942,314
DOUBLE-ENDED CORD HOLDER
Filed May 31, 1955
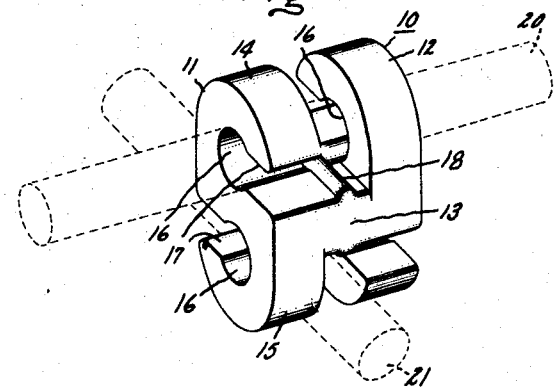
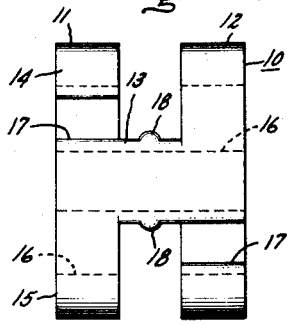
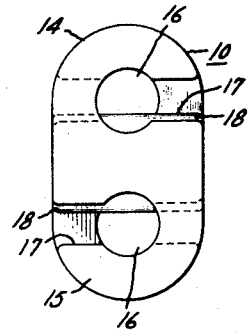
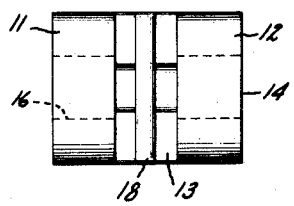
Inventors:
Sandy A. Debner,
Wallace R. Francis,
by Allard A. Braddock
Their Attorney.

United States Patent Office 2,942,314
Patented June 28, 1960

2,942,314
DOUBLE-ENDED CORD HOLDER

Sandy A. Debner, Bridgeport, and Wallace R. Francis, Milford, Conn., assignors to General Electric Company, a corporation of New York Filed May 31, 1955, Ser. No. 511,826

2 Claims. (Cl. 24—129)

The present invention relates to a device for clamping two cord lengths in parallel relation and particularly to a cord holder for use with electrical appliances so that the power supply cord may be neatly fastened around an appliance, such as a toaster, vacuum cleaner or flatiron, when the cord is not in use.

According to our invention we have provided a simple means for supporting the plug end of an electrical appliance cord when the appliance is not in use. It is our intention that the position of the cord holder should be readily adjustable on the cord to accommodate unforeseen conditions which might render a cord holder that is permanently attached to the cord inoperative or inconvenient to use. Thus, we have devised a double-ended cord holder which is separate from the cord and which may be readily attached at any place along the length of the cord so that a parallel cord length may be fastened to the other end of the cord holder.

The cord holder of the present invention comprises a body member formed as a parallel pair of oppositely facing S-shaped members joined together by a central connecting portion. Hence, a cord length is clamped in the holder by placing the cord between the S-shaped members at one end of the holder and turning the cord relative to the holder through 90° to complete the assembly. Since a portable electrical cord is usually made with an outer jacket of resilient material, it is possible for the cord holder to be molded from a rigid material such as polystyrene. Other suitable materials would include rubber or a vinyl material. A raised abutment or ridge is provided on both sides of the connecting portion to lie between the S-shaped members while being parallel thereto. The provision of the ridge makes the subject cord holder adaptable to different sizes of cords. The ridge also increases the frictional engagement between the cord and cord holder to resist any tendency of the cord holder to move along the cord.

The principal object of this invention is to provide a novel double-ended cord holder for supporting a pair of cord lengths in parallel relation.

A further object of this invention is to form a simple compact cord holder which is easy to assembly on the cord while being capable of a strong clamping or snubbing action.

A still further object of this invention is to provide a cord holder which is useful in clamping cords of various sizes and shapes.

Our invention will be better understood from the following description taken in connection with the accompanying drawing and its scope will be pointed out in the appended claims.

In the drawing:

Figure 1 is a perspective view of a double-ended cord holder embodying my invention showing how the cords (in dotted lines) are placed in and gripped by the holder.

Figure 2 is a left-side elevational view of the holder of Figure 1.

Figure 3 is a front elevational view of the holder of Figure 1.

Figure 4 is a top plan view of a holder embodying my invention.

Referring in detail to the drawing and in particular to Figure 1, it will be seen that the cord holder 10 has a configuration which is substantially that of a pair of parallel S-shaped members 11 and 12 which face in opposite directions and are joined together by a central connecting portion 13 as is best seen in Figure 3. The distance between the S-shaped members is substantially equal to the major diameter of the largest size of cord that may be gripped in the holder, as is clearly seen in Figure 1. The connecting portion 13 separates the holder into opposite end portions 14 and 15. The end 14 is provided with a pair of oppositely facing cord-engaging notches 16 in members 11 and 12. The entrance 17 of each snubbing notch is restricted, as is best seen in Figure 2, with respect to the main portion of the notch which is substantially the same size as the cord which is to be clamped therein. A raised abutment or ridge 18 is located on the top and bottom surfaces of the connecting portion 13 to lie transversely across the cords which are clamped in the holder. Hence, both small and large cords are clamped or snubbed by the notches 16 as well as deformed out of a straight line position by the ridge 18 to apply a strong clamping force onto the cord. The subject cord holder while being specially adaptable to cord of circular cross-section, is also useful on cord having an oval cross-section.

In Figure 1, the cord 20 shown in dotted lines is clamped by the end 14 of the holder. This is accomplished by first placing the cord 20 in the spacing over the ridge 18 to be in a position 90° removed from its position as shown. The initial position (not shown) of cord 20 relative to end 14 of the holder corresponds to the position of cord 21 relative to end 15 of the holder, as it is shown in Fig. 1 preparatory to clamping. Then, when the cord is turned in a clockwise direction or, alternately, when the holder 10 is turned in a counter-clockwise direction, the cord will enlarge the entrances 17 to the notches 16 until the cord is placed in the position shown in the upper portion of Figure 1.

The other end 15 of the holder 10 is similar to the end 14 just described, but the relative movements between the holder and cord would be opposite to the movements previously described. This arrangement gives a more dependable clamping action for the two lengths of cord, so that if only one cord is being disconnected, the other cord will not be influenced to likewise become disengaged from the holder.

Having described our invention of a novel double-ended cord holder for a parallel pair of electrical cords, it should be appreciated that this device is both easy to manufacture as well as convenient to use. It will provide a much stronger gripping action that other cord holders now available on the market. However, no sacrifice has been made in the ease of gripping the cord at the expense of this stronger clamping action. While we have elected to describe our invention as it relates to portable electrical cords of different sizes and shapes, it will be apparent that this invention is also useful in other arts where it is possible to support or attach a rope or line by a similar means.

Modifications of this invention will occur to those skilled in this art and it is to be understood, therefore, that this invention is not limited to the particular embodiments disclosed but that it is intended to cover all modifications which are within the true spirit and scope of the claims of this invention.

What we claim as new and desire to secure by Letters Patent of the United States is:

1. A double-ended cord holder comprising a body member with a parallel pair of oppositely facing S-shaped members joined together at their centers by a connecting portion, the distance between the S-shaped members being substantially equal to the major diameter of the largest size of cord that may be gripped in the holder, each S-shaped member being formed with two oppositely-facing cord-snubbing notches whereby two parallel lengths of cord may be gripped in the holder, one cord being above and the other cord disposed below the said connecting portion.

2. A double-ended cord holder as recited in claim 1 wherein the connecting portion is provided with a slight ridge on both its top and bottom surfaces, each ridge extending parallel to the pair of parallel S-shaped members, whereby a cord gripped in the oppositely facing notches on either side of the connecting portion will only be slightly deflected out of a straight line shape by the ridge.

References Cited in the file of this patent

UNITED STATES PATENTS

| | | |
|---|---|---|
| 562,528 | Hakansson | June 23, 1896 |
| 605,300 | Sammis | June 7, 1898 |
| 673,658 | Lawler | May 7, 1901 |
| 1,128,305 | Gammache | Feb. 16, 1915 |
| 1,531,746 | Fort | Mar. 31, 1925 |
| 2,329,389 | Bullum | Sept. 14, 1943 |

FOREIGN PATENTS

| | | |
|---|---|---|
| 15,656 | Great Britain | July 15, 1903 |